United States Patent
Cho et al.

(10) Patent No.: US 8,417,044 B2
(45) Date of Patent: Apr. 9, 2013

(54) METHOD AND APPARATUS FOR ENCODING/DECODING IMAGE USING ADAPTIVE DISTRIBUTION ADJUSTMENT OF DIFFERENTIAL VALUES

(75) Inventors: Jun-ho Cho, Suwon-si (KR); Tae-gyoung Ahn, Suwon-si (KR); Jae-hun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 12/488,184

(22) Filed: Jun. 19, 2009

(65) Prior Publication Data
US 2009/0317008 A1  Dec. 24, 2009

Related U.S. Application Data

(60) Provisional application No. 61/074,315, filed on Jun. 20, 2008.

(30) Foreign Application Priority Data

Oct. 13, 2008  (KR) .................. 10-2008-0100197

(51) Int. Cl.
*G06K 9/36* (2006.01)

(52) U.S. Cl.
USPC ........................................... 382/238

(58) Field of Classification Search .......... None
See application file for complete search history.

(56) References Cited

U.S. PATENT DOCUMENTS

| | | | |
|---|---|---|---|
| 5,960,116 A * | 9/1999 | Kajiwara | 382/238 |
| 6,111,986 A * | 8/2000 | Sun | 382/232 |
| 7,466,867 B2 * | 12/2008 | Sung et al. | 382/246 |
| 7,773,820 B2 * | 8/2010 | Sugita | 382/239 |
| 7,826,670 B2 * | 11/2010 | Sugita | 382/232 |
| 7,853,077 B2 * | 12/2010 | Sugita | 382/166 |
| 7,899,262 B2 * | 3/2011 | Sugita | 382/239 |
| 7,983,500 B2 * | 7/2011 | Zeng et al. | 382/245 |
| 8,175,324 B2 * | 5/2012 | Xuan et al. | 382/100 |
| 2005/0213812 A1 * | 9/2005 | Ishikawa et al. | 382/166 |
| 2006/0285756 A1 * | 12/2006 | Sugita | 382/232 |
| 2007/0047827 A1 * | 3/2007 | Sugita | 382/232 |
| 2010/0259631 A1 * | 10/2010 | Sugita | 348/222.1 |

\* cited by examiner

*Primary Examiner* — Chan S Park
*Assistant Examiner* — Sean Motsinger
(74) *Attorney, Agent, or Firm* — Sughrue Mion, PLLC

(57) ABSTRACT

Provided are an image encoding method and apparatus, in which a distribution of difference values included in an image unit is adjusted using a predetermined offset, an image unit including the adjusted distribution of the difference values is divided into an image plane corresponding to upper bits and an image plane for lower bits, and then the image planes are entropy-encoded.

22 Claims, 13 Drawing Sheets

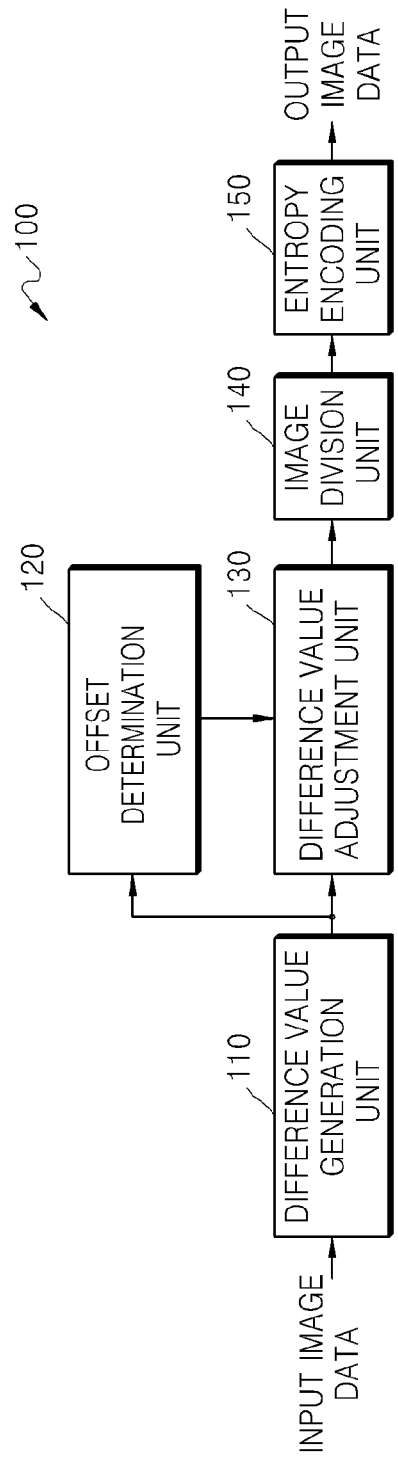

FIG. 2A

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |
| $P_{31}$ | $P_{32}$ | $P_{33}$ | $P_{34}$ | $P_{35}$ | $P_{36}$ | $P_{37}$ | $P_{38}$ |
| $P_{41}$ | $P_{42}$ | $P_{43}$ | $P_{44}$ | $P_{45}$ | $P_{46}$ | $P_{47}$ | $P_{48}$ |
| $P_{51}$ | $P_{52}$ | $P_{53}$ | $P_{54}$ | $P_{55}$ | $P_{56}$ | $P_{57}$ | $P_{58}$ |
| $P_{61}$ | $P_{62}$ | $P_{63}$ | $P_{64}$ | $P_{65}$ | $P_{66}$ | $P_{67}$ | $P_{68}$ |
| $P_{71}$ | $P_{72}$ | $P_{73}$ | $P_{74}$ | $P_{75}$ | $P_{76}$ | $P_{77}$ | $P_{78}$ |
| $P_{81}$ | $P_{82}$ | $P_{83}$ | $P_{84}$ | $P_{85}$ | $P_{86}$ | $P_{87}$ | $P_{88}$ |

FIG. 2B

| 90 | 8A | 8A | 7B | 64 | 57 | 4C | 58 |
|---|---|---|---|---|---|---|---|
| 87 | 84 | 88 | 7F | 63 | 4D | 42 | 4C |
| 8B | 86 | 8A | 85 | 6E | 51 | 45 | 50 |
| 7F | 7A | 7B | 7A | 64 | 52 | 47 | 4F |
| 85 | 7A | 73 | 74 | 62 | 51 | 45 | 50 |
| 90 | 83 | 76 | 6D | 58 | 4E | 48 | 4E |
| 8B | 86 | 84 | 75 | 5C | 4A | 45 | 49 |
| 95 | 91 | 92 | 83 | 60 | 59 | 53 | 58 |

FIG. 3A

| $X_{11}$ | $X_{12}$ | $X_{13}$ | $X_{14}$ | $X_{15}$ | $X_{16}$ | $X_{17}$ | $X_{18}$ |
|---|---|---|---|---|---|---|---|
| $X_{21}$ | $X_{22}$ | $X_{23}$ | $X_{24}$ | $X_{25}$ | $X_{26}$ | $X_{27}$ | $X_{28}$ |
| $X_{31}$ | $X_{32}$ | $X_{33}$ | $X_{34}$ | $X_{35}$ | $X_{36}$ | $X_{37}$ | $X_{38}$ |
| $X_{41}$ | $X_{42}$ | $X_{43}$ | $X_{44}$ | $X_{45}$ | $X_{46}$ | $X_{47}$ | $X_{48}$ |
| $X_{51}$ | $X_{52}$ | $X_{53}$ | $X_{54}$ | $X_{55}$ | $X_{56}$ | $X_{57}$ | $X_{58}$ |
| $X_{61}$ | $X_{62}$ | $X_{63}$ | $X_{64}$ | $X_{65}$ | $X_{66}$ | $X_{67}$ | $X_{68}$ |
| $X_{71}$ | $X_{72}$ | $X_{73}$ | $X_{74}$ | $X_{75}$ | $X_{76}$ | $X_{77}$ | $X_{78}$ |
| $X_{81}$ | $X_{82}$ | $X_{83}$ | $X_{84}$ | $X_{85}$ | $X_{86}$ | $X_{87}$ | $X_{88}$ |

FIG. 3B

| 90 | FA | 00 | F1 | E9 | F3 | F5 | 0C |
|---|---|---|---|---|---|---|---|
| 9F | 03 | 04 | 06 | FB | F7 | 00 | FE |
| 10 | FE | 00 | 04 | 05 | F9 | FF | 01 |
| F0 | 00 | FD | 04 | 01 | 0B | 01 | FD |
| 07 | FA | F8 | 02 | 04 | 01 | FF | 03 |
| 0A | FE | FA | F6 | FD | 07 | 06 | FB |
| FD | 0 | 0B | FA | FC | F8 | 01 | FE |
| 0F | 01 | 03 | 00 | 02 | FF | FF | 04 |

FIG. 4A

| $A_{11}$ | $A_{12}$ | $A_{13}$ | $A_{14}$ | $A_{15}$ | $A_{16}$ | $A_{17}$ | $A_{18}$ |
|---|---|---|---|---|---|---|---|
| $A_{21}$ | $A_{22}$ | $A_{23}$ | $A_{24}$ | $A_{25}$ | $A_{26}$ | $A_{27}$ | $A_{28}$ |
| $A_{31}$ | $A_{32}$ | $A_{33}$ | $A_{34}$ | $A_{35}$ | $A_{36}$ | $A_{37}$ | $A_{38}$ |
| $A_{41}$ | $A_{42}$ | $A_{43}$ | $A_{44}$ | $A_{45}$ | $A_{46}$ | $A_{47}$ | $A_{48}$ |
| $A_{51}$ | $A_{52}$ | $A_{53}$ | $A_{54}$ | $A_{55}$ | $A_{56}$ | $A_{57}$ | $A_{58}$ |
| $A_{61}$ | $A_{62}$ | $A_{63}$ | $A_{64}$ | $A_{65}$ | $A_{66}$ | $A_{67}$ | $A_{68}$ |
| $A_{71}$ | $A_{72}$ | $A_{73}$ | $A_{74}$ | $A_{75}$ | $A_{76}$ | $A_{77}$ | $A_{78}$ |
| $A_{81}$ | $A_{82}$ | $A_{83}$ | $A_{84}$ | $A_{85}$ | $A_{86}$ | $A_{87}$ | $A_{88}$ |

FIG. 4B

| 98 | 02 | 08 | F9 | F1 | FB | FD | 14 |
|---|---|---|---|---|---|---|---|
| A7 | 0B | 0C | 0E | 03 | FF | 08 | 06 |
| 18 | 06 | 08 | 0C | 0D | 01 | 07 | 09 |
| F8 | 08 | 05 | 0C | 09 | 13 | 09 | 05 |
| 0F | 02 | 00 | 0A | 0C | 09 | 07 | 0B |
| 12 | 06 | 02 | FE | 05 | 0F | 0E | 03 |
| 05 | 10 | 13 | 02 | 04 | 00 | 09 | 06 |
| 17 | 09 | 0B | 08 | 0A | 07 | 07 | 0C |

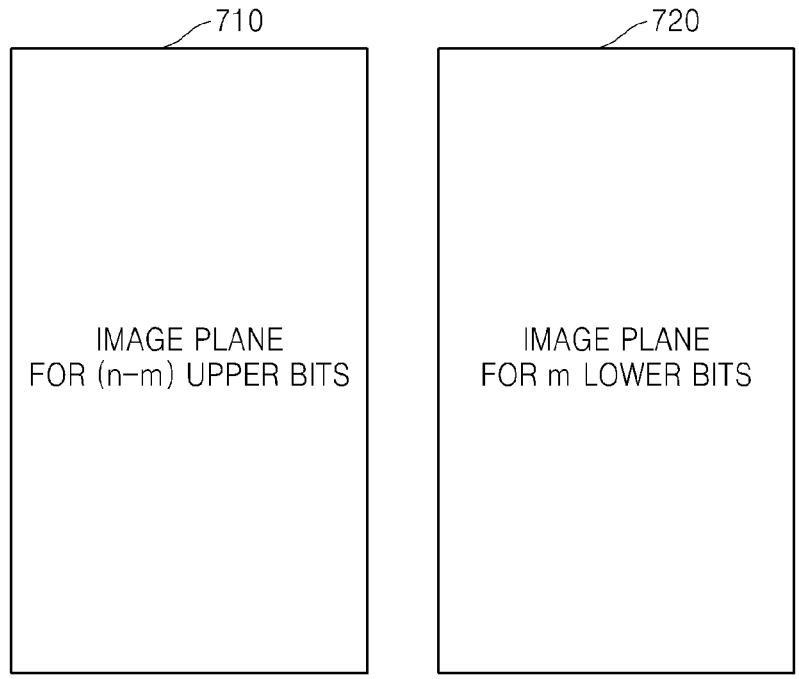

METHOD AND APPARATUS FOR ENCODING/DECODING IMAGE USING ADAPTIVE DISTRIBUTION ADJUSTMENT OF DIFFERENTIAL VALUES

CROSS-REFERENCE TO RELATED PATENT APPLICATION

This application claims the benefit of U.S. Provisional Application No. 61/074,315, filed on Jun. 20, 2008, in the USPTO, and Korean Patent Application No. 10-2008-0100197, filed on Oct. 13, 2008, in the Korean Intellectual Property Office (KIPO), the disclosures of which are incorporated herein in their entirety by reference.

BACKGROUND OF THE INVENTION

1. Field of the Invention

Methods and apparatuses consistent with the present invention relate to encoding or decoding an image, and more particularly, to a method and apparatus for encoding or decoding an image unit including n-bit pixel values.

2. Description of the Related Art

An image is lossy-compressed according to conventional video codec standards, such as MPEG-1, MPEG-2, MPEG-4, and H.264/MPEG-4 Advanced Video Coding (AVC), which have been suggested for video compression. That is, an image is compressed at a high rate of compression while disregarding a loss that occurs during the compression encoding.

However, as demand for high-resolution images has increased, much attention has been paid to the development of a method and apparatus for losslessly encoding/decoding an image. In a method of losslessly encoding/decoding an image, the original image is losslessly compressed but should also be compressed at a high rate so that an encoding/decoding apparatus may be designed in which the sizes of a data bus and memory necessary for image data processing are reduced. However, if a complex compression algorithm is used for compression at a high rate, system complexity increases.

SUMMARY OF THE INVENTION

Exemplary embodiments of the present invention provide a method and apparatus for encoding/decoding an image, and more particularly, a method and apparatus for encoding/decoding an image unit including n-bit pixel values.

According to an exemplary embodiment of the present invention, there is provided an image encoding method including generating a second image unit including n-bit difference values by respectively subtracting predicted values of n-bit pixel values included in a first image unit from the n-bit pixel values included in the first image unit, where n is a positive integer equal to or greater than 1; determining an offset for adjusting a distribution of the difference values in the second image unit, based on the distribution of the difference values in the second image unit; generating a third image unit by respectively adding the offset to the difference values in the second image unit, where the third image unit includes an adjusted distribution of n-bit difference values; dividing the third image unit into an image plane corresponding to m lower bits and an image plane corresponding to (n−m) upper bits, where m means a number of bits determined based on the offset and m is a positive integer less than or equal to n; and respectively entropy-encoding the image planes according to different entropy encoding methods.

The determining of the offset may include determining an offset S based on an absolute value D of a value obtained by subtracting a difference value of a least frequency from a difference value of a highest frequency from among difference values smaller than K in the distribution of the difference values included in the second image unit, where K is $2^{n/2}$.

The determining of the offset S may include determining the offset S by rounding up the absolute value D to $2^I$ closest to the absolute value D, where the index I is a positive integer equal to or greater than 1.

The dividing of the third image unit may include generating a first image plane corresponding to m lower bits of the adjusted distribution of the difference values included in the third image unit; and generating a second image plane for (n−m) upper bits of the adjusted distribution of the difference values included in the third image unit.

The number of bits m determined based on the offset S may be calculated according to an equation $m = 1 + \log_2 S$.

The entropy-encoding of the image planes may include entropy-encoding the first image plane by using Huffman encoding; and entropy-encoding the second image plane by using run-length encoding.

The entropy-encoding of the second image plane may further include entropy-encoding the second image plane, which has been entropy-encoded using run-length encoding, by using Huffman encoding.

According to another aspect of the present invention, there is provided an image decoding method including respectively entropy-decoding data regarding an image plane corresponding to m lower bits of a third image unit and data regarding an image plane corresponding to (n−m) upper bits of the third image unit according to different entropy decoding methods, where n is a positive integer equal to or greater than 1 and m is a positive integer less than or equal to n; reconstructing the third image unit including an adjusted distribution of n-bit difference values by combining the image planes obtained through the entropy-decoding; generating a second image unit including n-bit difference values by respectively subtracting a predetermined offset from the adjusted distribution of the difference values; and reconstructing n-bit pixel values of a first image unit by respectively adding the n-bit difference values of the second image unit with predicted values of the respective n-bit difference values of the second image unit.

According to another aspect of the present invention, there is provided an image encoding apparatus including a difference value generation unit generating a second image unit including n-bit difference values by respectively subtracting predicted values of n-bit pixel values included in a first image unit from the n-bit pixel values included in the first image unit, where n is a positive integer equal to or greater than 1; an offset determination unit determining an offset for adjusting a distribution of the difference values in the second image unit, based on the distribution of the difference values in the second image unit; a difference value adjustment unit generating a third image unit by respectively adding the offset to the difference values in the second image unit, where the third image unit includes an adjusted distribution of n-bit difference values; an image division unit dividing the third image unit into an image plane corresponding to m lower bits and an image plane corresponding to (n−m) upper bits, where m means a number of bits determined based on the offset and m is a positive integer less than or equal to n; and an entropy-encoding unit respectively entropy-encoding the image planes according to different entropy encoding methods.

According to another aspect of the present invention, there is provided an image decoding apparatus including an entropy-decoding unit respectively entropy-decoding data regarding an image plane corresponding to m lower bits of a third image unit and data regarding an image plane corresponding to (n−m) upper bits of the third image unit according to different entropy decoding methods, where n is a positive integer equal to or greater than 1 and m is a positive integer less than or equal to n; an image combining unit reconstructing the third image unit including an adjusted distribution of n-bit difference values by combining the image planes obtained through the entropy-decoding; a difference adjustment unit generating a second image unit including n-bit difference values by respectively subtracting a predetermined offset from the adjusted distribution of the difference values; and a pixel value generation unit reconstructing n-bit pixel values of a first image unit by respectively adding the n-bit difference values of the second image unit with predicted values of the respective n-bit difference values of the second image unit.

According to another aspect of the present invention, there is provided a computer readable recording medium having recorded thereon a computer program for executing the above methods.

BRIEF DESCRIPTION OF THE DRAWINGS

The above and other features and aspects of the present invention will become more apparent by describing in detail exemplary embodiments thereof with reference to the attached drawings in which:

FIG. 1 is a block diagram of an image encoding apparatus according to an exemplary embodiment of the present invention;

FIGS. 2A and 2B illustrate a first image unit according to an exemplary embodiment of the present invention;

FIGS. 3A and 3B illustrate a second image unit according to an exemplary embodiment of the present invention;

FIGS. 4A and 4B illustrate a third image unit according to an exemplary embodiment of the present invention;

FIGS. 7A through 7C illustrate image planes according to exemplary embodiments of the present invention;

DETAILED DESCRIPTION OF THE INVENTION

Figure 5A:
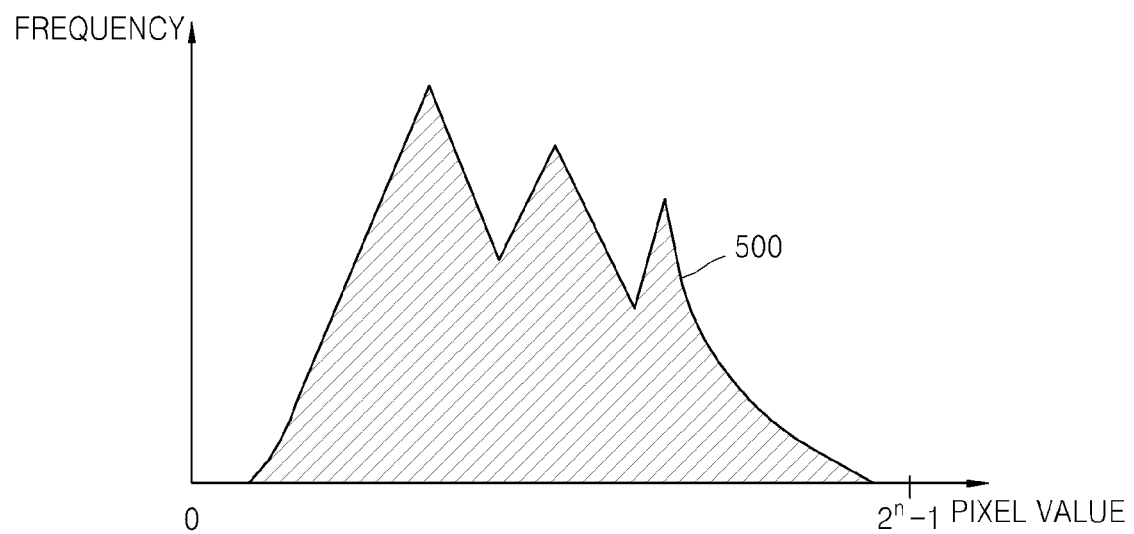
FIGS. 5A through 5D are histograms illustrating pixel values, difference values and an adjusted distribution of the difference values according to an exemplary embodiment of the present invention.

Hereinafter, exemplary embodiments of the present invention will be described in greater detail with reference to the accompanying drawings.

FIG. 1 is a block diagram of an image encoding apparatus 100 according to an exemplary embodiment of the present invention. Referring to FIG. 1, the image encoding apparatus 100 includes a difference value generation unit 110, an offset determination unit 120, a difference value adjustment unit 130, an image division unit 140 and an entropy encoding unit 150.

The difference value generation unit 110 generates a second image including n-bit difference values by respectively subtracting predicted values from the n-bit pixel values in the first image unit.

The predicted values of the respective pixel values included in the first image are generated, and then the second image including n-bit difference values is obtained by respectively subtracting the predicted values from the pixel values. Various methods may be used to generate the predicted values of the respective pixel values included in the first image. For example, a conventional intra prediction method and inter prediction method according to the MPEG-4 H.264 standard may be used to generate the predicted values of the respective pixel values included in the first image, and generate the difference values in the second image by respectively subtracting the predicted values from the pixel values.

However, according to another exemplary embodiment, the pixel values included in the first processing unit may be respectively predicted from pixel values adjacent to the respective pixel values. In the conventional intra prediction method and inter prediction method, system complexity increases since a current picture or a reference picture should be detected for prediction. Thus, there is a need for a prediction method using an algorithm that does not greatly increase system complexity. Such a prediction method will be described in greater detail with reference to FIGS. 2A, 2B, 3A and 3B. In FIGS. 2A, 2B, 3A and 3B, 8×8 image units are illustrated as examples but it would be apparent to those of ordinary skill in the art that an exemplary embodiment of the present invention can be applied to various image units.

FIGS. 2A and 2B illustrate a first image according to an exemplary embodiment of the present invention. FIG. 2A illustrates $P_{11}$ through $P_{88}$ that respectively denote pixel values. FIG. 2B illustrates examples of the pixel values $P_{11}$ through $P_{88}$.

FIGS. 3A and 3B illustrate a second image according to an exemplary embodiment of the present invention. FIG. 3A illustrates difference values $X_{11}$ through $X_{88}$ between the pixel values $P_{11}$ through $P_{88}$ of FIG. 2A. FIG. 3B illustrates examples of the difference values $X_{11}$ through $X_{88}$. FIG. 3B illustrates a case where the pixel values and difference values therebetween are 8-bit values and these values are expressed using hexadecimal numbers.

Each of the difference values $X_{11}$ through $X_{18}$ between the $P_{11}$ through $P_{18}$ in the first row is obtained using a pixel value nearest to the left side of a corresponding pixel value as a predicted value. The pixel value $P_{11}$ has no pixel value nearest to the left side thereof. Thus, the pixel value $P_{11}$ itself is directly used as the difference value $X_{11}$. The difference values $X_{12}$ through $X_{18}$ are calculated as follows:

$$X_{11} = P_{11}$$

$$X_{12} = P_{12} - P_{11}$$

$$X_{13} = P_{13} - P_{12}$$

$$X_{14} = P_{14} - P_{13}$$

$$X_{15} = P_{15} - P_{14}$$

$$X_{16} = P_{16} - P_{15}$$

$$X_{17} = P_{17} - P_{16}$$

$$X_{18} = P_{18} - P_{17}$$

For example, the difference value $X_{12}$ in the first row, second column, is calculated by using the pixel value $P_{11}$ in the first row, first column, which is nearest to the left side of the pixel value $P_{12}$, as a predicted value of the pixel value $P_{12}$, and by subtracting the predicted value $P_{11}$ from the pixel value $P_{12}$. Each of the other difference values $X_{13}$ through $X_{18}$ is calculated by using a pixel value nearest to the left side of the corresponding pixel value as a predicted value.

A difference value is calculated through a subtraction operation using a complement. Referring to FIG. 3B, the above difference value $X_{12}$ in the first row, second column, is calculated by subtracting the predicted value $P_{11}$, i.e., "90", from the pixel value $P_{12}$ in the first row, second column, i.e., "8A". If the subtraction operation is expressed using binary numbers, "10010000" is subtracted from "10001010". In the subtraction operation using a complement, the difference value $X_{12}$ is "11111001" which is the sum of "01101111" which is a complement of "10010000" and "10001010". If "11111001" is expressed using hexadecimal numbers, the difference value $X_{12}$ in the first row, second column of FIG. 3B is "FA".

When a carry bit occurs during the addition of "01101111", which is the complement of "10010000", and "10001010", a difference value is calculated by further adding the carry bit to the addition result. For example, the difference value $X_{18}$ in the first row, eighth column, is calculated by subtracting the predicted value $P_{17}$, i.e., '4C', from the pixel value $P_{18}$ in the first row, eighth column, i.e., '58'. If this subtraction operation is expressed using binary numbers, "01001100" is subtracted from "01011000". In the subtraction operation using a complement, "100001011", which is the sum of "10110011" (complement of "01001100") and "01011000", should be the difference value $X_{18}$ in the first row, eighth column. However, since a carry bit occurs in a most significant bit (MSB) and increases the total number of bits in the 8-bit difference value, the carry bit is added to an 8-bit binary value and thus "00001100", i.e., "0C", is the difference value $X_{18}$.

The difference values $X_{11}$ through $X_{81}$ in the first column are calculated as follows:

$$X_{21}=P_{21}-(P_{11}+P_{18}-0)$$

$$X_{31}=P_{31}-(P_{21}+P_{28}-P_{18})$$

$$X_{41}=P_{41}-(P_{31}+P_{38}-P_{28})$$

$$X_{51}=P_{51}-(P_{41}+P_{48}-P_{38})$$

$$X_{61}=P_{61}-(P_{51}+P_{58}-P_{48})$$

$$X_{71}=P_{71}-(P_{61}+P_{68}-P_{58})$$

$$X_{81}=P_{81}-(P_{71}+P_{78}-P_{68})$$

The difference value $X_{21}$ in the second row, first column, is calculated using a predicted value $(P_{11}+P_{18}-0)$, and the difference value $X_{31}$ in the third row, first column, is calculated using a predicted value $(P_{21}+P_{28}-P_{18})$. In the case of the difference values $X_{41}$ through $X_{81}$, the parts in parentheses also denote predicted values of the respective, corresponding pixel values.

The other difference values $X_{22}$ through $X_{28}$, $X_{32}$ through $X_{38}$, $X_{42}$ through $X_{48}$, $X_{52}$ through $X_{58}$, $X_{62}$ through $X_{68}$, $X_{72}$ through $X_{78}$, and $X_{82}$ through $X_{88}$ may be calculated as follows. The difference values $X_{22}$ through $X_{28}$ in the second row will be explained as an example.

$$X_{22}=P_{22}-(P_{12}+P_{21}-P_{11})$$

$$X_{23}=P_{23}-(P_{13}+P_{22}-P_{12})$$

$$X_{24}=P_{24}-(P_{14}+P_{23}-P_{13})$$

$$X_{25}=P_{25}-(P_{15}+P_{24}-P_{14})$$

$$X_{26}=P_{26}-(P_{16}+P_{25}-P_{15})$$

$$X_{27}=P_{27}-(P_{17}+P_{26}-P_{16})$$

$$X_{28}=P_{28}-(P_{18}+P_{27}-P_{17})$$

A difference value of a pixel value is calculated by generating a predicted value of the pixel value based on pixel values adjacent to the left, upper left, and upper sides of the pixel value, and then subtracting the predicted value from the pixel value. The difference value $X_{22}$ in the second row, second column, is calculated by generating a predicted value $(P_{12}+P_{21}-P_{11})$ based on the pixel value $P_{12}$ in the first row, second column, which is adjacent to the upper side of the pixel value $P_{22}$, the pixel value $P_{11}$ in the first row, first column, which is adjacent to the upper left side of the pixel value $P_{22}$, and the pixel value $P_{21}$ in the second row, first column, which is adjacent to the left side of the pixel value $P_{22}$, and then subtracting the predicted value $(P_{12}+P_{21}-P_{11})$ from the pixel value $P_{22}$.

Similarly, each of the difference values between the pixel values in the other rows is calculated by generating a predicted value based on pixel values adjacent to the left, upper left, and upper sides of the corresponding pixel value.

Referring back to FIG. 1, as illustrated in FIGS. 3A and 3B, when the difference value generation unit 110 generates the second image including n-bit difference values, the offset determination unit 120 determines an offset based on a distribution of the difference values included in the second image. The offset is used for adjusting a distribution of difference values and is thus determined adaptively to the distribution of the difference values included in the second image.

If the offset determination unit 120 determines the offset, the difference value adjustment unit 130 generates a third image including an adjusted distribution of different values by respectively adding the offset to the difference values $X_{11}$ through $X_{88}$ illustrated in FIGS. 3A and 3B.

FIGS. 4A and 4B illustrate a third image according to an exemplary embodiment of the present invention. FIG. 4A illustrates $A_{11}$ through $A_{88}$ that denote an adjusted distribution of difference values between pixels. FIG. 4B illustrates examples of the difference values $A_{11}$ through $A_{88}$. If an offset '8' is added to the difference values of FIG. 3B, the third image of FIG. 4B, which includes the adjusted distribution of the difference values, is generated.

If a carry bit occurs during the addition of the offset and increases the total number of n bits of the difference values (eight bits in the exemplary embodiment of FIG. 3B), then the carry bit is disregarded. For example, if an offset '8' is added to "FA" in the second row, first column of FIG. 3B, "102", which is a hexadecimal number, is the difference value $A_{12}$ in the first row, second column, a distribution of which is adjusted. Here, a most significant bit '1' is the carry bit increasing the total number of bits, i.e., eight bits, of the difference value $A_{12}$, and is thus disregarded. Thus, "02" becomes the difference value $A_{12}$ in the first row, second column, the distribution of which is adjusted.

The offset determination unit 120 and the difference value adjustment unit 130 will be described in greater detail with reference to FIGS. 5A through 5D.

FIGS. 5A through 5D are histograms illustrating pixel values, difference values, and an adjusted distribution of the difference values according to an exemplary embodiment of the present invention. Referring to FIG. 5A, the n-bit pixel values illustrated in FIG. 2B may be identical to a distribution 500 of pixel values illustrated in the histogram of FIG. 5A. If the pixel values are n bits, a maximum pixel value may range from 0 to $2^n-1$.

Figure 5B:
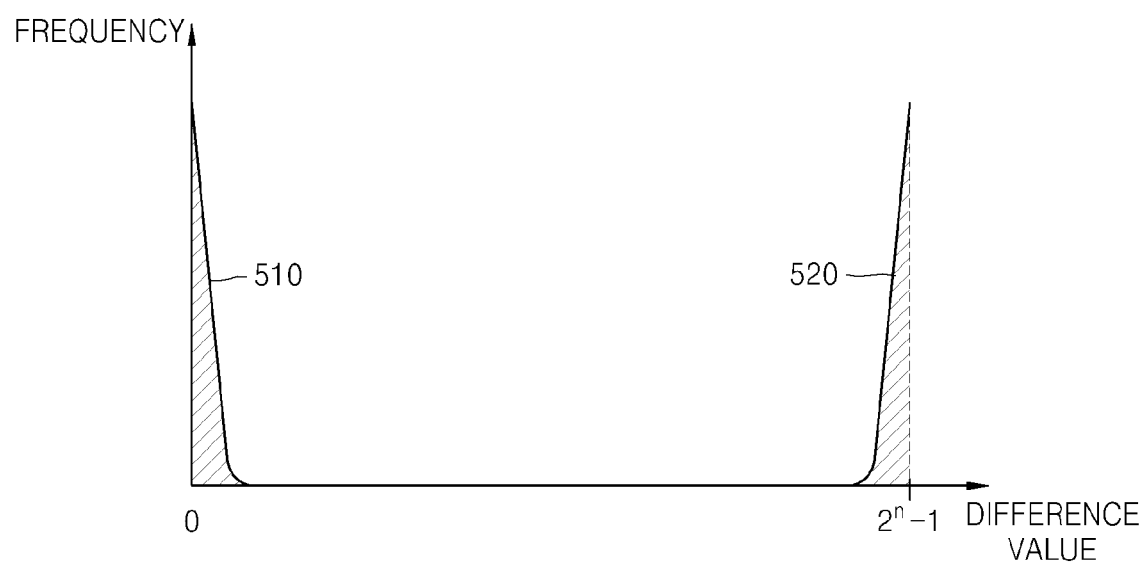

Referring to FIG. 5B, the n-bit difference values illustrated in FIG. 3A may show a first distribution 510 of pixel values and a second distribution 520 of pixel values, as illustrated in the histogram of FIG. 5B. As described above with reference to FIGS. 3A and 3B, the difference values $X_{11}$ through $X_{88}$ included in the second image are obtained by subtracting predicted values from respective pixel values. Each of the predicted values is generated based on pixel values adjacent to the pixel value, and thus the adjacent pixel values are probably the same or similar to one another. Thus, the difference values $X_{11}$ through $X_{88}$ between the pixel values and the predicted values probably approximate '0' or $2^n-1$.

If the pixel values are greater than the predicted values thereof, the difference values $X_{11}$ through $X_{88}$ show the first distribution 510. If the pixel values are less than the predicted values thereof, the difference values $X_{11}$ through $X_{88}$ show the second distribution 520. As described above, since a subtraction operation using a complement is used when subtracting a predicted value from a pixel value thereof, the difference values $X_{11}$ through $X_{88}$ may show the second distribution 520.

Figure 5C:
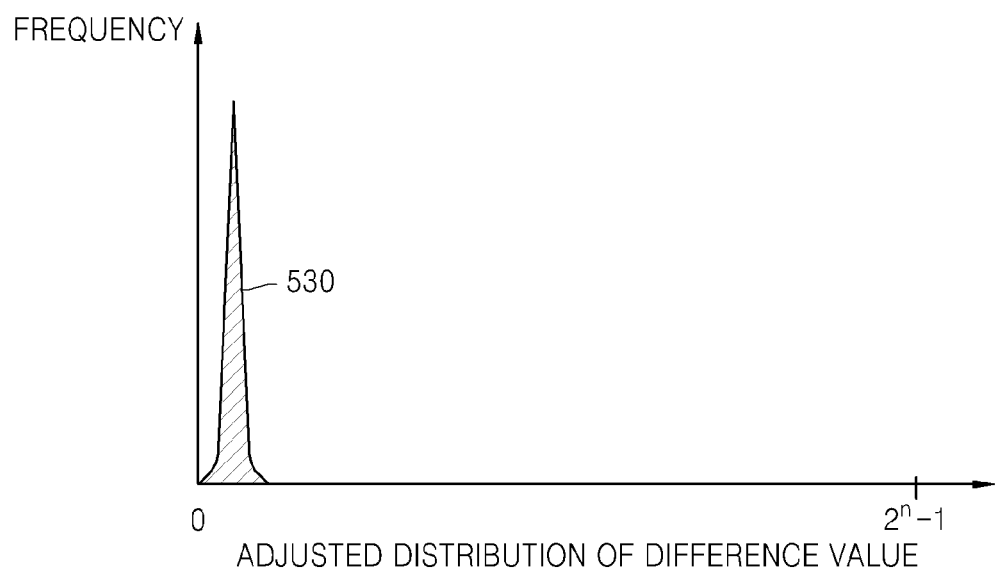

Referring to FIG. 5C, the adjusted distribution of the n-bit difference values of FIG. 4A is identical to a third distribution 530 illustrated in FIG. 5C. The difference value adjustment unit 130 of FIG. 1 adds a predetermined offset to the difference values $X_{11}$ through $X_{88}$ included in the second image in order to generate difference values $A_{11}$ through $A_{88}$ included in the third image. Accordingly, the difference values included in the second distribution 520 of FIG. 5B are adjusted and then are included in the third distribution 530 of FIG. 5C.

In FIG. 5B, the differential values included in the first distribution 520 shift to the right when an offset is added thereto. In other words, the left half of the third distribution 530 illustrated in FIG. 5C is obtained by adding the offset to the difference values included in the second distribution 520 of FIG. 5B, and the right half of the third distribution 530 is obtained by adding the offset to the difference values included in the first distribution 510 of FIG. 5B.

As illustrated in FIGS. 5A to 5C, a predetermined offset is added to the difference values $X_{11}$ through $X_{88}$ included in the second image in order to generate the third distribution 530 by adjusting the first and second distributions 510 and 520.

A rate of compression is improved when a distribution of difference values is adjusted so that only small difference values can be distributed as illustrated in FIG. 5C. If only small difference values are included in the adjusted distribution of the difference values as illustrated in FIG. 5C, upper bits of the adjusted distribution of the difference values are probably '0'. Also, the rate of compression can be improved during image encoding when only bits that are probably '0' are entropy-encoded.

Figure 5D:
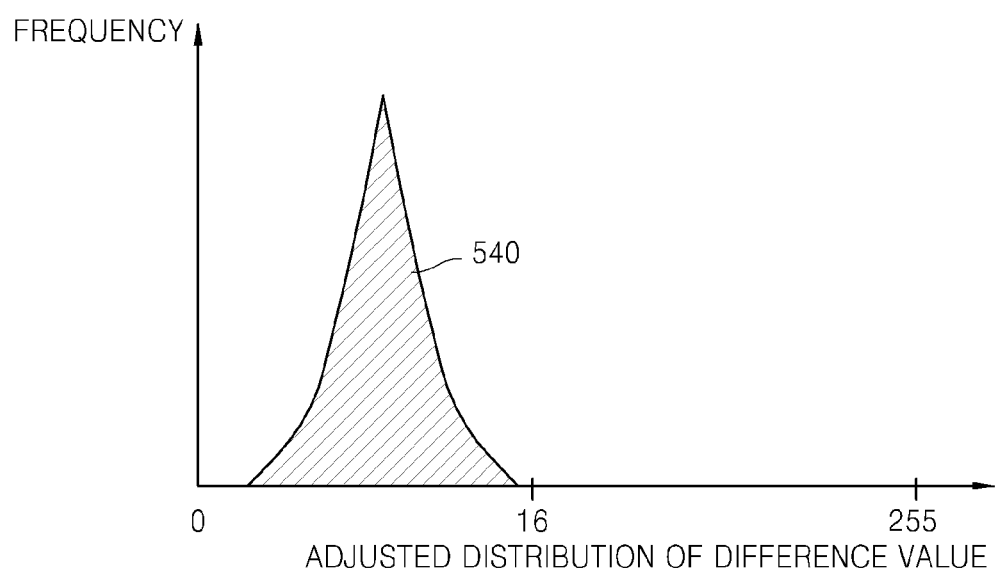

FIG. 5D is a histogram illustrating an adjusted distribution of 8-bit difference values included in the third image according to an exemplary embodiment of the present invention. Referring to FIG. 5D, since the adjusted distribution of the difference values $A_{11}$ through $A_{88}$ are less than '16', four upper bits of the adjusted distribution of the difference values $A_{11}$ through $A_{88}$ are probably '0'.

Figure 6:
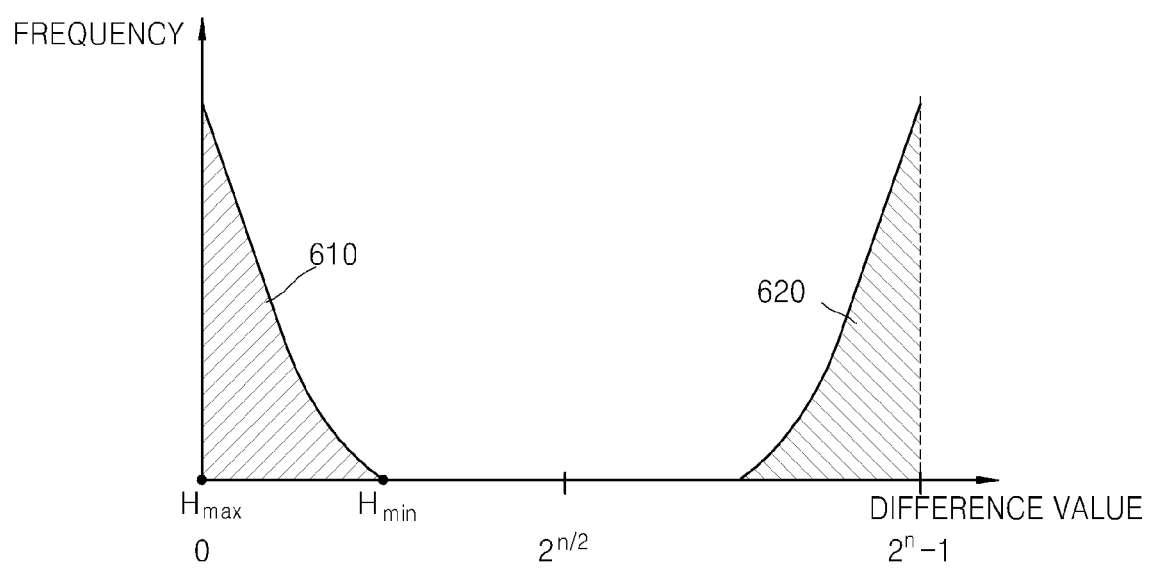
FIG. 6 is a histogram illustrating a method of determining an offset according to an exemplary embodiment of the present invention.

FIG. 6 is a histogram illustrating a method of determining an offset according to an exemplary embodiment of the present invention. In order to adjust a distribution of difference values as illustrated in FIGS. 5C and 5D, the offset determination unit 120 of FIG. 1 refers to the distribution of the difference values $X_{11}$ through $X_{88}$ included in the second image. In the histogram, an offset is determined so that all difference values in a right distribution 620 may be located to the left side of a left distribution 610.

To this end, first, the offset determination unit 120 determines a difference value of a maximum frequency $H_{max}$ and a difference value of a minimum frequency $H_{min}$. Since adjacent pixel values are probably the same, the difference value of the maximum frequency $H_{max}$ is probably '0' and the difference value of the minimum frequency $H_{min}$ may vary according to the characteristics of an image. In this case, the difference value of the maximum frequency $H_{max}$ and the difference value of the minimum frequency $H_{min}$ are determined based on only half the entire distribution range of 0 to $2^n-1$, i.e., a distribution range between 0 and less than K ($K=2^{n/2}$). In general, the difference values $X_{11}$ through $X_{88}$ included in the second image are distributed to be bilaterally symmetrical. Accordingly, an offset may be precisely determined even when only half the distribution of the difference values $X_{11}$ through $X_{88}$ is used.

After the difference value of the maximum frequency $H_{max}$ and the difference value of the minimum frequency $H_{min}$ are determined, the offset determination unit 120 calculates an absolute value D of the result of subtracting the difference value of the minimum frequency $H_{min}$ from the difference value of the maximum frequency $H_{max}$, $|H_{max}-H_{min}|$. A value C obtained by rounding up the absolute value D to a power of 2 closest to the absolute value D may become an offset S. In other words, the offset S is calculated by rounding up the absolute value D to $2^I$, where I denotes a positive integer equal to or greater than '1' and less than n. For example, when the absolute value D is calculated to be '7', the offset S is the value C obtained by rounding up '7' to '8' which is a power of 2 closest to '7'.

Referring back to FIG. 1, the image division unit 140 divides the third image including the adjusted distribution of the n-bit difference values $A_{11}$ through $A_{88}$ into an image plane corresponding to m lower bits and an image plane corresponding to (n−m) upper bits. As described above with reference to FIG. 5C, upper bits of the adjusted distribution of the n-bit difference values $A_{11}$ through $A_{88}$ are probably '0'. Thus the rate of compression of an image may be improved by dividing the third image into the image plane corresponding to the upper bits and the image plane corresponding to the lower bits and then entropy-encoding the image planes. This method will now be described in greater detail with reference to FIGS. 7A through 7C.

Figure 7C:
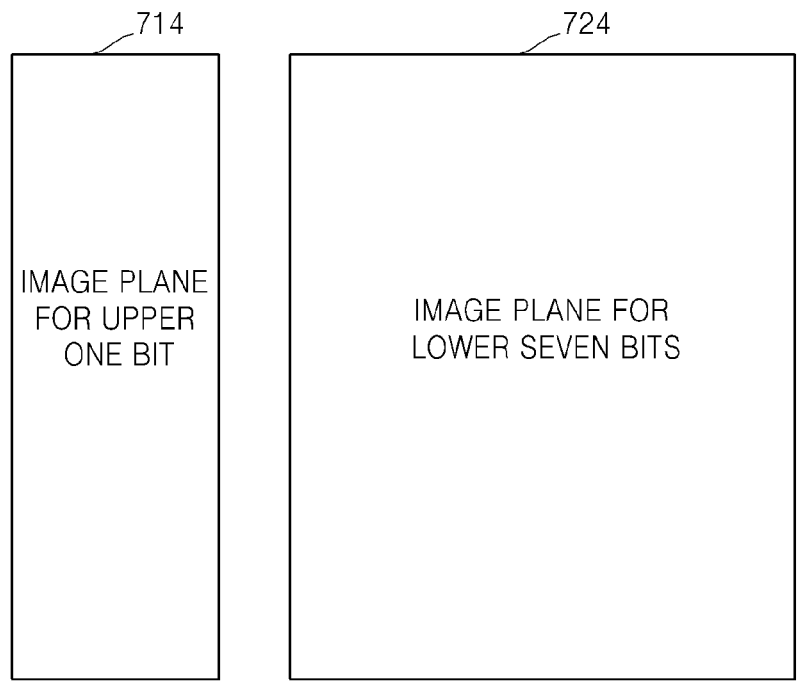

FIGS. 7A through 7C illustrate image planes according to exemplary embodiments of the present invention. Referring to FIG. 7A, the image division unit 140 of FIG. 1 divides a third image including an adjusted distribution of n-bit difference values $A_{11}$ through $A_{88}$ into an image plane corresponding to m lower bits and an image plane corresponding to (n−m) upper bits.

FIG. 7B illustrates a case where image planes 712 and 714 are generated by dividing the adjusted distribution of the 8-bit difference values illustrated in FIG. 4B into four upper bits and four lower bits. The image plane 712 includes four upper bits of the difference values illustrated in FIG. 4B. For example, a pixel value in the first row, first column of the image plane 712 may consist of '9' which is four upper bits in the first row, first column of FIG. 4B and '0' which is four upper bits in the first row, second column of FIG. 4B. Also, a pixel value in the first row, second column of the image plane 712 may consist of '0' which is four upper bits in the first row, third column of FIG. 4B, and 'F' which is four upper bits in the first row, fourth column of FIG. 4B.

Likewise, the image plane 722 corresponding to the four lower bits consists of four lower bits of the difference values illustrated in FIG. 4B. For example, a pixel value in the first row, first column of the image plane 722 consists of '8' which is four lower bits in the first row, first column of FIG. 4B and '2' which is four lower bits in the first row, second column of FIG. 4B.

The number of bits m, which is a reference value for dividing the third image, is determined based on an offset S determined by the offset determination unit 120. If the offset S is determined to be large, the adjusted distribution of the n-bit difference values included in the third image increases. More lower bits are necessary to express the increased distribution of the difference values. That is, the greater the offset S, the greater the number of bits m, and the less the offset S, the less the number of bits m. The number of bits m which is the reference value for dividing the third image may be calculated using an equation $m=1+\log_2 S$.

For example, if the offset S is '8', the adjusted distribution of the difference values is an adjusted distribution 540 of difference values ranging from 0 to 15, and the difference values from 0 to 15 may be expressed using the four lower bits as described above with reference to FIGS. 5C and 5D. In other words, a bit value necessary to express the adjusted distribution of the difference values may be calculated to be '4', i.e., $1+\log_2 8=4$.

FIG. 7C illustrates image planes 714 and 724 when a number of bits m, which is a reference value for dividing an image, is '7', according to an exemplary embodiment of the present invention. Referring to FIG. 7C, a third image including an adjusted distribution of 8-bit difference values is divided into the image plane 714 corresponding to one upper bit and the image plane 742 for seven lower bits. If the adjusted distribution of the difference values range from 0 to 127, the seven lower bits are used to express the adjusted distribution of the difference values. Thus the third image is divided into the image plane 714 corresponding to the one upper bit and the image plane 724 corresponding to the seven lower bits.

Referring back to FIG. 1, the entropy encoding unit 150 respectively entropy-encodes an image plane corresponding to m lower bits and an image plane corresponding to (n–m) upper bits, which are generated by the image division unit 140, according to different entropy encoding methods.

Figure 8:
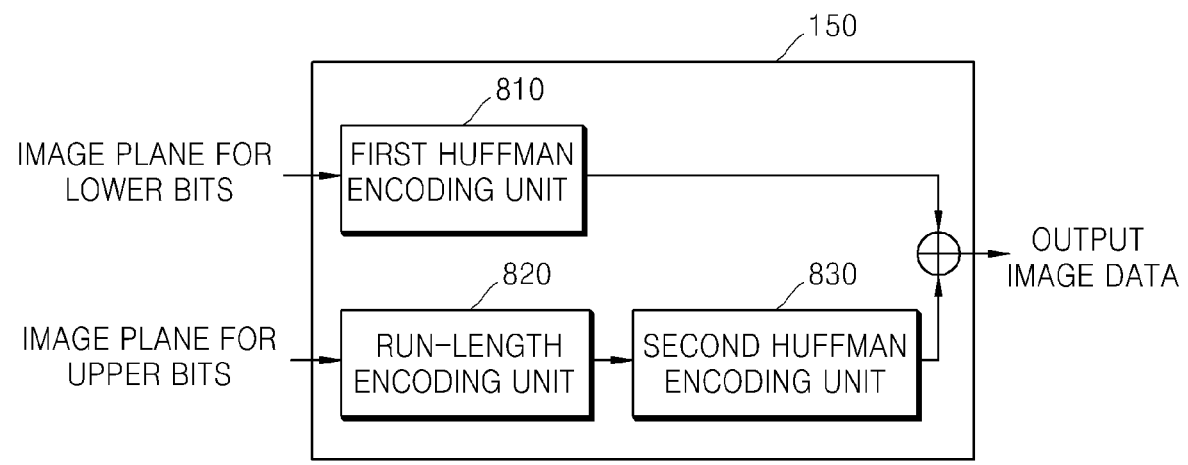
FIG. 8 is a block diagram of an entropy encoding apparatus according to an exemplary embodiment of the present invention.

FIG. 8 is a block diagram of an entropy encoding apparatus 150 according to an exemplary embodiment of the present invention. Referring to FIG. 8, the entropy encoding unit 150 includes a first Huffman encoding unit 810, a run-length encoding unit 820 and a second Huffman encoding unit 830.

The first Huffman encoding unit 810 entropy-encodes the above_image plane 720 (or 722 or 724) corresponding to lower bits through Huffman encoding. The total number of '0's in the image plane 720 (or 722 or 724) corresponding to lower bits is less than in the image plane 710 (or 712 or 722). Thus the image plane 720 (or 722 or 724) is variable-length encoded through Huffman encoding. Huffman encoding is a type of entropy encoding method, which is based on a probability that symbols, i.e., difference values, will be generated. That is, a difference value that is not likely to occur is encoded with a bitstream with more bits and a difference value which is likely to occur is encoded with a bitstream with less bits. Huffman encoding would be apparent to those of ordinary skill in the art.

The run-length encoding unit 820 entropy-encodes the image plane 710 (or 712 or 714) corresponding to upper bits by performing run-length encoding. Upper bits of the adjusted distribution of the difference values are probably '0'. Actually, many '0's are present in the image plane 712 corresponding to the four upper bits illustrated in FIG. 7B. Thus the image plane 710 (or 712 or 714) corresponding to upper bits is entropy-encoded by performing run-length encoding. Run-length encoding is a type of entropy encoding method performed based on the total number of continuous bits '0' and would be apparent to those of ordinary skill in the art.

The image plane 710 (or 712 or 714) corresponding to upper bits is entropy-encoded again by the Huffman encoding unit 830. The image plane 710 (or 712 or 714) that has been entropy-encoded by performing run-length encoding is entropy-encoded again through Huffman encoding, thereby increasing the rate of compression.

Figure 9:
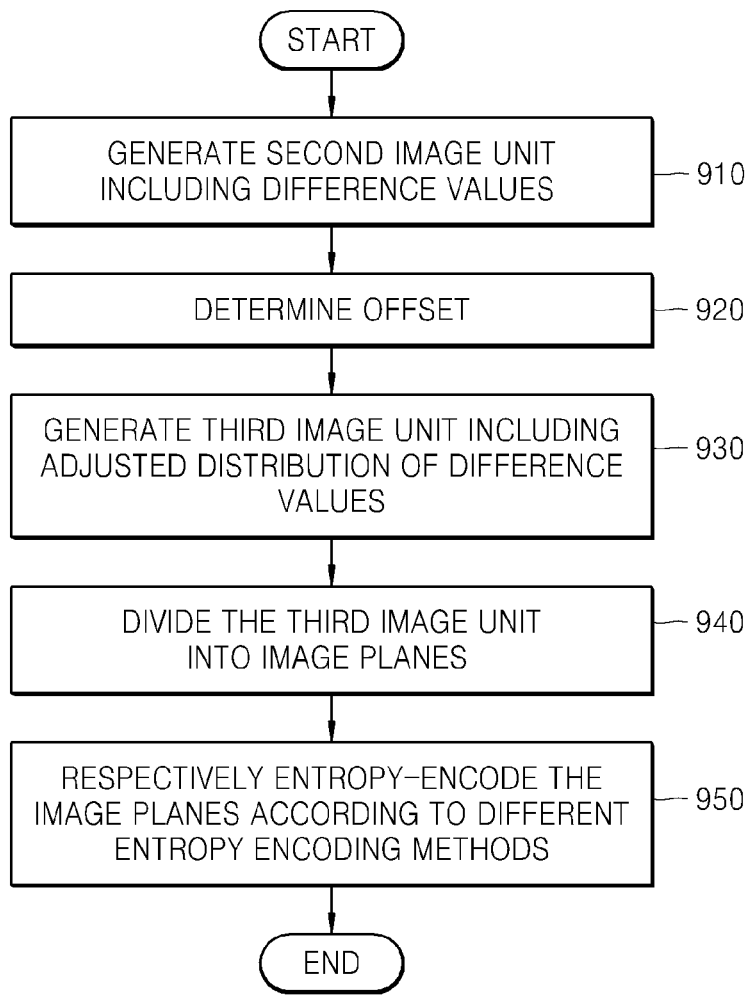
FIG. 9 is a flowchart illustrating an image encoding method according to an exemplary embodiment of the present invention.

FIG. 9 is a flowchart illustrating an image encoding method according to an exemplary embodiment of the present invention. Referring to FIG. 9, in operation 910, an image encoding apparatus generates a second image including n-bit difference values. The second image is generated by respectively subtracting predicted values from the n-bit pixel values.

The predicted values may be determined according to a conventional intra prediction method or inter prediction method, or may be determined based on other pixel values adjacent to the respective pixel value as described above with reference to FIG. 3A.

In operation 920, the image encoding apparatus determines an offset S for adjusting a distribution of the n-bit difference values included in the second image. The offset S is added to the n-bit difference values so that the distribution of the n-bit difference values, such as illustrated in FIG. 5B, may change as illustrated in FIG. 5C or 5D. A method of determining the offset S is as described above with reference to FIG. 6.

In operation 930, the image encoding apparatus generates a third image including an adjusted distribution of difference values by respectively adding the determined offset S to the n-bit difference values included in the second image. The third image has been described above with reference to FIGS. 4A and 4B.

In operation 940, the image encoding apparatus divides the third image into an image plane corresponding to (n–m) upper bits and an image plane corresponding to m lower bits. That is, the third image is divided into an image plane corresponding to upper (n–m) bits that are probably '0' and an image plane for the other m lower bits. The number of bits m which is a reference value for dividing the third image may be determined based on the offset S, as described above with reference to FIGS. 7A through 7C.

In operation 950, the image encoding apparatus respectively entropy-encodes the image planes according to different entropy encoding methods.

For example, the image plane corresponding to (n–m) upper bits is entropy-encoded using run-length encoding, and the image plane corresponding to m lower bits is variable-length entropy encoded using Huffman encoding. The image plane corresponding to (n–m) upper bits that was entropy-encoded using run-length encoding may be entropy-encoded again using Huffman encoding, as described above.

Figure 10:
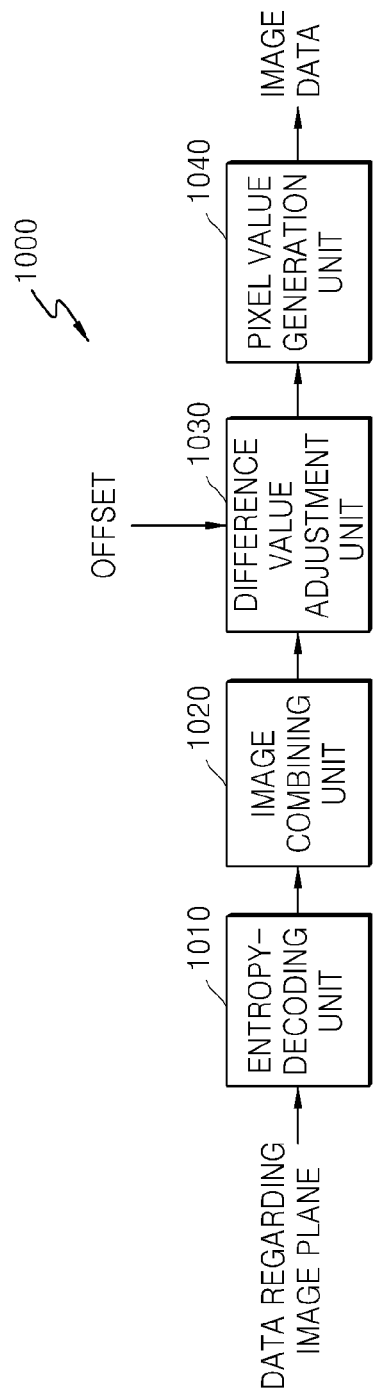
FIG. 10 is a block diagram of an image decoding apparatus according to an exemplary embodiment of the present invention.

FIG. 10 is a block diagram of an image decoding apparatus according to an exemplary embodiment of the present invention. Referring to FIG. 10, the image decoding apparatus 1000 includes an entropy-decoding unit 1010, an image combining unit 1020, a difference value adjustment unit 1030 and a pixel value generation unit 1040.

The entropy-decoding unit 1010 receives an image plane corresponding to (n–m) upper bits and an image plane corresponding to m lower bits, which are included in a third image, and respectively entropy-decodes data regarding these image planes according to different entropy decoding methods.

The data regarding the image plane corresponding to m lower bits is entropy-decoded using Hoffman decoding. The data regarding the image plane corresponding to (n−m) upper bits is entropy-decoded using Hoffman decoding and then is entropy-decoded again using run-length decoding. If the data regarding the image plane corresponding to (n−m) upper bits has been encoded using only run-length encoding, the data is entropy-decoded using only run-length decoding.

The image combining unit 1020 combines these image planes received from the entropy-decoding unit 1010 in order to reconstruct the third image. The third image includes an adjusted distribution of n-bit difference values. For example, the image plane 712 and the image plane 722 illustrated in FIG. 7B are combined to reconstruct the third image of FIG. 4B.

The difference value adjustment unit 1030 reconstructs the n-bit difference values, the distribution of which has yet to be adjusted, based on the adjusted distribution of the n-bit difference values included in the third image being reconstructed by the image combining unit 1020. As a result of the reconstructing, a second image is generated. For example, a second image as illustrated in FIG. 3B is reconstructed by subtracting a predetermined offset from the adjusted distribution of n-bit difference values included in the third image as illustrated in FIG. 4B. Thus, the distribution of the difference values as illustrated in FIG. 5C or 5D changes as illustrated in FIG. 5B.

The predetermined offset was used to generate the third image and may be obtained when the entropy-decoding unit 1010 decodes the data regarding these image planes. An offset S may be calculated from a number of bits m which is a reference value for dividing an image. The number of bits m is calculated using the equation $m=1+\log_2 S$. Thus, if $m=4$, $S=2^3=8$. The offset S is subtracted from the adjusted distribution of the n-bit difference values by using the above subtraction operation using a complement.

The pixel value generation unit 1040 respectively adds the n-bit difference values included in the second image and predicted values thereof in order to reconstruct n-bit pixel values included in a first image.

The predicted values may be generated using a conventional intra prediction method or an inter prediction method, and may be added to the difference values in the second image in order to reconstruct the first image.

According to an exemplary embodiment of the present invention, the n-bit pixel values in the first image are reconstructed by performing the method described above with reference to FIG. 2A, 2B, 3A or 3B in the reverse manner.

A pixel value in first row of the first image may be reconstructed as follows:

$P_{11}=X_{11}$ $P_{12}=X_{12}+P_{11}$ $P_{13}=X_{13}+P_{12}$ $P_{14}=X_{14}+P_{13}$ $P_{15}=X_{15}+P_{14}$ $P_{16}=X_{16}+P_{15}$ $P_{17}=X_{17}+P_{16}$ $P_{18}=X_{18}+P_{17}$

The other pixel values in first column of the first image may be reconstructed as follows:

$P_{21}=X_{21}+(P_{11}+P_{18}-00)$ $P_{31}=X_{31}+(P_{21}+P_{28}-P_{18})$ $P_{41}=X_{41}+(P_{31}+P_{38}-P_{28})$ $P_{51}=X_{51}+(P_{41}+P_{48}-P_{38})$ $P_{61}=X_{61}+(P_{51}+P_{58}-P_{48})$ $P_{71}=X_{71}+(P_{61}+P_{68}-P_{58})$ $P_{81}=X_{81}+(P_{71}+P_{78}-P_{68})$

The other pixel values in the first image may be reconstructed in a similar manner. For example, pixel values $P_{22}$ through $P_{28}$ in second row of the first image are reconstructed as follows:

$P_{22}=X_{22}+(P_{12}+P_{21}-P_{11})$ $P_{23}=X_{23}+(P_{13}+P_{22}-P_{12})$ $P_{24}=X_{24}+(P_{14}+P_{23}-P_{13})$ $P_{25}=X_{25}+(P_{15}+P_{24}-P_{14})$ $P_{26}=X_{26}+(P_{16}+P_{25}-P_{15})$ $P_{27}=X_{27}+(P_{17}+P_{26}-P_{16})$ $P_{28}=X_{28}+(P_{18}+P_{27}-P_{17})$

Figure 11:
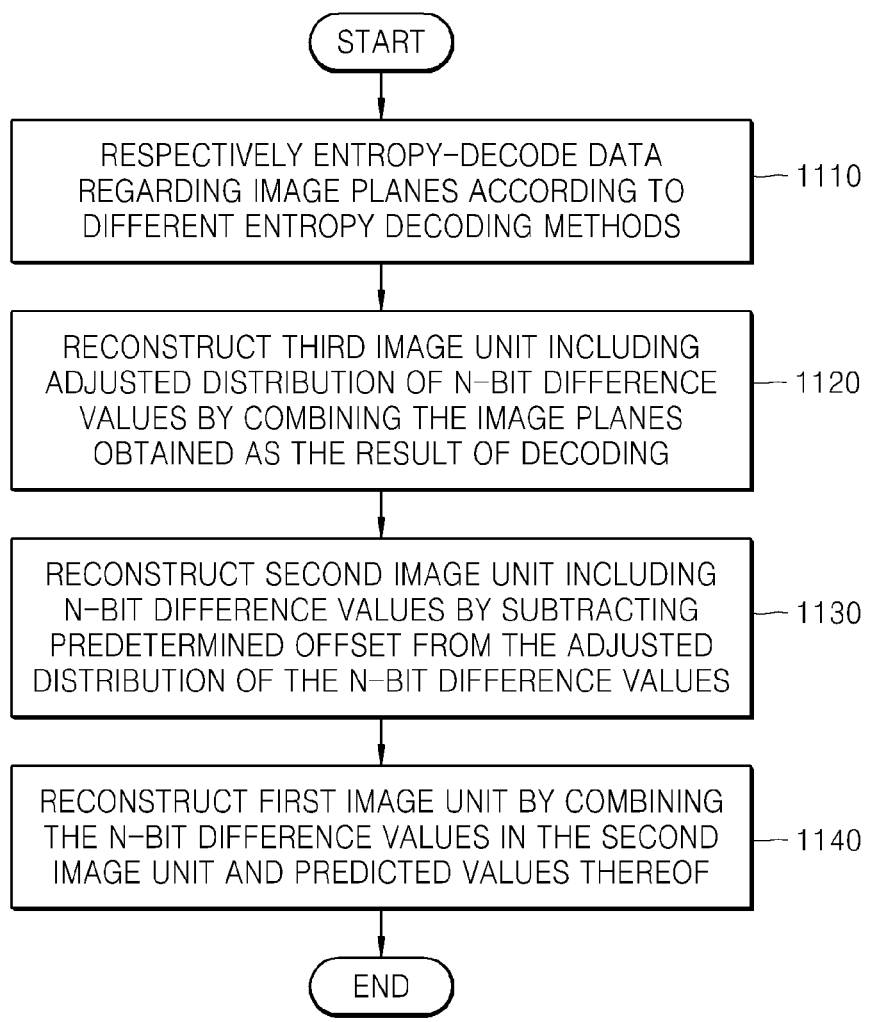
FIG. 11 is a block diagram of an image decoding method according to an exemplary embodiment of the present invention.

FIG. 11 is a flowchart illustrating an image decoding method according to an exemplary embodiment of the present invention. Referring to FIG. 11, in operation 1110, an image decoding apparatus respectively entropy-decodes data regarding an image plane corresponding to (n−m) upper bits and data regarding an image plane corresponding to m lower bits according to different entropy decoding methods.

The data regarding the image plane corresponding to m lower bits is entropy-decoded using Hoffman decoding. The data regarding the image plane corresponding to (n−m) upper bits is entropy-decoded using Hoffman decoding and then is entropy-decoded again by performing run-length decoding.

In operation 1120, the image decoding apparatus combines these image planes obtained in operation 1110 in order to reconstruct a third image including an adjusted distribution of n-bit difference values. The third image is reconstructed from a combination of bits included in the image planes.

In operation 1130, the image decoding apparatus reconstructs a second image including n-bit difference values, the distribution of which has yet to be adjusted, by subtracting a predetermined offset from the adjusted distribution of the n-bit difference values in the third image.

In operation 1140, the image decoding apparatus combines the n-bit difference values in the second image obtained in operation 1130 and predicted values thereof in order to reconstruct a first image. The first image is reconstructed by performing the method of generating n-bit difference values as described above with reference to FIG. 2A, 2B, 3A or 3D in a reverse manner.

The system according to the present invention may be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method comprising:
generating a second image including n-bit difference values by respectively subtracting predicted values of n-bit pixel values in a first image from the n-bit pixel values in the first image, where n is a positive integer equal to or greater than 1;
determining an offset for adjusting a distribution of the n-bit difference values in the second image, based on the distribution of the n-bit difference values in the second image;
generating a third image by adding the offset to the n-bit difference values in the second image, where the third image comprises an adjusted distribution of the n-bit difference values;
dividing the third image into a first image plane corresponding to m lower bits and a second image plane corresponding to (n−m) upper bits, where m is a number of bits determined based on the offset and m is a positive integer less than or equal to n; and
respectively entropy-encoding the first and the second image planes according to different entropy encoding methods.

2. The method of claim 1, wherein the determining of the offset comprises determining an offset S based on an absolute value D of a value obtained by subtracting a difference value of a least frequency from a difference value of a highest frequency from among difference values smaller than K in the distribution of the n-bit difference values in the second image, where K is $2^{n/2}$.

3. The method of claim 2, wherein the determining of the offset S comprises determining the offset S by rounding up the absolute value D to $2^I$ closest to the absolute value D, where the index I is a positive integer equal to or greater than 1.

4. The method of claim 3, wherein the first image plane corresponds to m lower bits of the adjusted distribution of the n-bit difference values in the third image; and
the second image plane corresponds to (n−m) upper bits of the adjusted distribution of the n-bit difference values in the third image.

5. The method of claim 4, wherein the number of bits m determined based on the offset S is calculated according to an equation $m=1+\log_2 S$.

6. The method of claim 4, wherein the entropy-encoding of the first image plane comprises entropy-encoding the first image plane by using Huffman encoding; and
the entropy-encoding of the second image plane comprises entropy-encoding the second image plane by using run-length encoding.

7. The method of claim 6, wherein the entropy-encoding of the second image plane further comprises entropy-encoding the second image plane, which has been entropy-encoded using run-length encoding, by using Huffman encoding.

8. An image decoding method comprising:
respectively entropy-decoding data regarding a first image plane corresponding to m lower bits of a third image and data regarding a second image plane corresponding to (n−m) upper bits of the third image according to different entropy decoding methods, where n is a positive integer equal to or greater than 1 and m is a positive integer less than or equal to n;
reconstructing the third image including an adjusted distribution of n-bit difference values by combining the first and the second image planes obtained through the entropy-decoding;
generating a second image including n-bit difference values by respectively subtracting an offset from the adjusted distribution of the n-bit difference values; and
reconstructing n-bit pixel values of a first image by respectively adding the n-bit difference values of the second image with predicted values of the respective n-bit difference values of the second image,
wherein the offset is determined based on the m.

9. The method of claim 8, wherein the offset comprises an offset S determined based on an absolute value D of a value obtained by subtracting a difference value of a least frequency from a difference value of a highest frequency from among difference values smaller than K in the distribution of the n-bit difference values in the second image, where K is $2^{n/2}$.

10. The method of claim 9, wherein the offset S is determined by rounding up the absolute value D to $2^I$ closest to the absolute value D, where the index I is a positive integer equal to or greater than 1.

11. The method of claim 10, wherein the first image plane comprises a first image plane corresponding to m lower bits of an adjusted distribution of difference values in the third image, where m is a number of bits determined based on the offset S; and
the second image plane comprises a second image plane corresponding to (n−m) upper bits of the adjusted distribution of the difference values in the third image.

12. The method of claim 11, wherein the number of bits m determined based on the offset S is calculated according to an equation $m=1+\log_2 S$.

13. The method of claim 8, wherein the entropy-decoding of the data regarding the first image plane comprises entropy-decoding the data regarding the first image plane by using Huffman decoding; and
the entropy-decoding of the data regarding the second image plane comprises entropy-decoding the data regarding the second image plane by using Huffman decoding.

14. The method of claim 13, wherein the entropy-decoding of the data regarding the second image plane further comprises entropy-decoding the data regarding the second image plane, which has been entropy-decoded using Huffman decoding, by using run-length decoding.

15. An image encoding apparatus comprising:
a difference value generation unit which generates a second image including n-bit difference values by respectively subtracting predicted values of n-bit pixel values in a first image from the n-bit pixel values in the first image, where n is a positive integer equal to or greater than 1;
an offset determination unit which determines an offset for adjusting a distribution of the n-bit difference values in the second image, based on the distribution of the n-bit difference values in the second image;
a difference value adjustment unit which generates a third image by adding the offset to the n-bit difference values in the second image, where the third image comprises an adjusted distribution of n-bit difference values;

an image division unit which divides the third image into a first image plane corresponding to m lower bits and a second image plane corresponding to (n−m) upper bits, where m is a number of bits determined based on the offset and m is a positive integer less than or equal to n; and an entropy-encoding unit which respectively entropy-encodes the first and the second image planes according to different entropy encoding methods.

16. The apparatus of claim 15, wherein the offset determination unit determines an offset S based on an absolute value D of a value obtained by subtracting a difference value of a least frequency from a difference value of a highest frequency from among difference values smaller than K in the distribution of the n-bit difference values in the second image, where K is $2^{n/2}$.

17. The apparatus of claim 16, wherein the image division unit generates the first image plane corresponding to m lower bits of the adjusted distribution of the difference values in the third image, and generates the second image plane corresponding to (n−m) upper bits of the adjusted distribution of the difference values in the third image.

18. An image decoding apparatus comprising:
an entropy-decoding unit which respectively entropy-decodes data regarding a first image plane corresponding to m lower bits of a third image and data regarding a second image plane corresponding to (n−m) upper bits of the third image according to different entropy decoding methods, where n is a positive integer equal to or greater than 1 and m is a positive integer less than or equal to n;

an image combining unit which reconstructs the third image including an adjusted distribution of n-bit difference values by combining the first and the second image planes obtained through the entropy-decoding;

a difference adjustment unit which generates a second image including n-bit difference values by subtracting an offset from the adjusted distribution of the n-bit difference values; and a pixel value generation unit which reconstructs n-bit pixel values of a first image by respectively adding the n-bit difference values of the second image with predicted values of the respective n-bit difference values of the second image, wherein the offset is determined based on the m.

19. The apparatus of claim 18, wherein the offset comprises an offset S determined based on an absolute value D of a value obtained by subtracting a difference value of a least frequency from a difference value of a highest frequency from among difference values smaller than K in the distribution of the n-bit difference values in the second image, where K is $2^{n/2}$.

20. The apparatus of claim 19, wherein the first image plane comprises a first image plane corresponding to m lower bits of an adjusted distribution of difference values in the third image, where m is a number of bits m determined based on the offset S; and the second image plane comprises a second image plane corresponding to (n−m) upper bits of the adjusted distribution of the difference values in the third image.

21. A non-transitory computer readable recording medium having recorded thereon a computer program for executing the method of claim 1.

22. A non-transitory computer readable recording medium having recorded thereon a computer program for executing the method of claim 8.

\* \* \* \* \*